(12) United States Patent
Gwidt et al.

(10) Patent No.: US 10,066,576 B2
(45) Date of Patent: Sep. 4, 2018

(54) DUAL INJECTION DURING INTAKE STROKE FOR IMPROVED CATALYST LIGHT OFF

(71) Applicant: GM Global Technology Operations LLC, Detroit, MI (US)

(72) Inventors: Jesse Michael Gwidt, Brighton, MI (US); Jeffrey M. Hutmacher, Fowlerville, MI (US); Rafat F. Hattar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 54 days.

(21) Appl. No.: 15/220,136

(22) Filed: Jul. 26, 2016

(65) Prior Publication Data

US 2018/0030918 A1 Feb. 1, 2018

(51) Int. Cl.
| | |
|---|---|
| F01N 3/00 | (2006.01) |
| F02D 41/40 | (2006.01) |
| F01N 3/10 | (2006.01) |
| F01N 11/00 | (2006.01) |
| F02D 35/02 | (2006.01) |
| F02P 5/145 | (2006.01) |
| F01N 3/20 | (2006.01) |
| F02D 41/02 | (2006.01) |

(52) U.S. Cl.
CPC .......... *F02D 41/402* (2013.01); *F01N 3/101* (2013.01); *F01N 3/2066* (2013.01); *F01N 11/005* (2013.01); *F02D 35/028* (2013.01); *F02D 41/027* (2013.01); *F02D 41/401* (2013.01); *F02P 5/145* (2013.01); *F01N 2550/02* (2013.01)

(58) Field of Classification Search
USPC ......... 60/274, 276, 284, 285, 286, 297, 301, 60/303
See application file for complete search history.

(56) References Cited

U.S. PATENT DOCUMENTS

| | | | | |
|---|---|---|---|---|
| 6,116,208 | A * | 9/2000 | Nishimura | F01N 3/0842 123/295 |
| 6,330,796 | B1* | 12/2001 | Nishimura | F02D 41/024 123/295 |
| 7,222,602 | B2* | 5/2007 | Fukasawa | F02D 41/1498 123/299 |
| 8,838,316 | B2 | 9/2014 | Whitney et al. | |
| 2008/0087251 | A1* | 4/2008 | Idogawa | F02D 41/0255 123/445 |
| 2010/0139248 | A1 | 6/2010 | Najt et al. | |
| 2010/0212294 | A1 | 8/2010 | Narayanaswamy et al. | |
| 2010/0305830 | A1 | 12/2010 | Santoso et al. | |
| 2011/0226214 | A1* | 9/2011 | Ogata | F02B 23/104 123/299 |
| 2012/0316754 | A1 | 12/2012 | Narayanaswamy et al. | |
| 2015/0144102 | A1 | 5/2015 | Shibata et al. | |
| 2016/0356229 | A1* | 12/2016 | Watanabe | F02D 41/064 |

* cited by examiner

*Primary Examiner* — Binh Q Tran

(57) ABSTRACT

A method for operating a spark-ignition direct-injection internal combustion engine coupled to an exhaust aftertreatment system including a catalytic converter includes monitoring an operating state of the catalytic converter. The method further includes determining if a piston of the engine is entering an intake stroke. The method further includes injecting a first quantity of fuel into a cylinder in which the piston of the engine is entering the intake stroke, and injecting a second quantity of fuel into the cylinder in which the piston of the engine is entering the intake stroke.

19 Claims, 3 Drawing Sheets

DUAL INJECTION DURING INTAKE STROKE FOR IMPROVED CATALYST LIGHT OFF

FIELD

The invention relates generally to direct injection engines and more particularly to systems and methods for catalyst light off.

BACKGROUND

The statements in this section merely provide background information related to the present disclosure and may or may not constitute prior art.

In a gasoline engine, over 99% of the engine emissions are converted to clean output ($H_2O$ and $CO_2$) by the catalyst in the catalytic converter. However, to operate properly, the catalyst must be heated to a temperature equal to or above a light-off temperature. The light-off temperature is approximately equal to 400° C. The majority of the exhaust gas emissions that are captured exiting the exhaust gas treatment system during an emissions test occur during the first 60 seconds of engine operation while the catalyst temperature is below the light-off temperature, and cannot efficiently convert the engine emissions to $H_2O$ and $CO_2$.

Conventional vehicle powertrains typically will execute a Catalyst Light Off (CLO) strategy immediately upon starting the engine when the drivetrain is in park or neutral and hope to finish before the driver depresses the accelerator pedal and drives away. Moreover, conventional vehicle powertrains will typically execute a CLO strategy during conditions when the gasoline engine is operating and when the catalyst is determined to have fallen below the light-off temperature. This way the focus of CLO strategy can be on the emissions performance of the engine and not the drivability of the vehicle.

As a whole, conventional CLO strategies are effective at reducing gas emissions, however there is a need in the art for CLO strategies that further reduce emissions and which improve the diagnostic reproducibility and reliability of catalyst performance while maintaining the driving quality of motor vehicle engines.

SUMMARY

In one aspect of the present invention, a method for operating a spark-ignition direct-injection internal combustion engine coupled to an exhaust aftertreatment system including a catalytic converter includes monitoring an operating state of the catalytic converter. The method further includes determining if a piston of the engine is entering an intake stroke. The method further includes injecting a first quantity of fuel into a cylinder in which the piston of the engine is entering the intake stroke. The method further includes injecting a second quantity of fuel into the cylinder in which the piston of the engine is entering the intake stroke.

In another aspect of the present invention, the monitoring an operating state of the catalytic converter further includes determining the temperature of the catalytic converter.

In yet another aspect of the present invention, the monitoring an operating state of the catalytic converter further includes predicting the temperature of the catalytic converter.

In yet another aspect of the present invention, the determining if a piston of the engine is entering an intake stroke further includes monitoring a crank shaft position of the engine.

In yet another aspect of the present invention, injecting a first quantity of fuel into a cylinder further includes injecting the first quantity of fuel into the cylinder when a first threshold crank position has been reached.

In yet another aspect of the present invention, the method further includes waiting a predetermined interval of time after injecting the first quantity of fuel into the cylinder.

In yet another aspect of the present invention, the injecting a second quantity of fuel into a cylinder further includes injecting the second quantity of fuel into the cylinder when the predetermined interval of time has lapsed.

In yet another aspect of the present invention, the injecting a first quantity of fuel into a cylinder further includes injecting the first quantity of fuel into the cylinder when a first threshold crank position of 300 degrees of crank shaft rotation has been reached.

In yet another aspect of the present invention, the injecting a second quantity of fuel into a cylinder further includes injecting the second quantity of fuel into the cylinder before a crank position of 200 degrees of crank shaft rotation has been reached.

In yet another aspect of the present invention, the method further includes retarding an initiation of a spark in the cylinder.

In yet another aspect of the present invention, a method for operating a spark-ignition direct-injection internal combustion engine coupled to an exhaust aftertreatment system including a catalytic converter includes determining an operating temperature of the catalytic converter. The method further includes monitoring a crank shaft position of the engine. The method further includes determining if a piston within a cylinder of the engine is entering an intake stroke from the crank shaft position. The method further includes selectively injecting a volume of fuel into the cylinder in which the piston of the engine is entering the intake stroke. The method further includes igniting the quantity of fuel.

In yet another aspect of the present invention determining an operating temperature of the catalytic converter further includes predicting the temperature of the catalytic converter.

In yet another aspect of the present invention selectively injecting a volume of fuel further includes injecting a first quantity of fuel during the intake stroke, and injecting a second quantity of fuel during the intake stroke.

In yet another aspect of the present invention the first quantity of fuel is substantially equal to the second quantity of fuel.

In yet another aspect of the present invention the method further includes waiting a predetermined interval of time after injecting the first quantity of fuel before injecting the second quantity of fuel.

In yet another aspect of the present invention the injecting a first quantity of fuel during the intake stroke, and injecting a second quantity of fuel during the intake stroke further includes injecting the first quantity of fuel starting at approximately 300° before top-dead center during the intake stroke, and injecting the second quantity of fuel before approximately 200° before top-dead center during the intake stroke.

In yet another aspect of the present invention the igniting the volume of fuel further includes retarding an initiation of a spark within the cylinder to approximately 30° after top-dead-center of an expansion stroke subsequent to the intake stroke.

In yet another aspect of the present invention a method for operating a spark-ignition direct-injection internal combustion engine coupled to an exhaust aftertreatment system having a three-way catalytic converter upstream of an NH3-SCR catalyst includes upon detecting a temperature of a three-way catalytic converter that is below a predetermined threshold temperature, operating the engine in a catalyst light-off mode. The method further includes executing a split pulse fuel injection, and retarding a spark ignition event.

In yet another aspect of the present invention executing the split pulse fuel injection further includes executing a first fuel pulse having a first volume and a first time duration early in an intake stroke of a cylinder of the engine. The method further includes waiting a predetermined time period during the intake stroke. The method further includes executing a second fuel pulse late in the intake stroke and after the predetermined time period has elapsed. The method further includes the second fuel pulse having a second volume and a second time duration substantially equal to the first volume and the first time duration late in the intake stroke and after the predetermined time period has elapsed.

In yet another aspect of the present invention the retarding a spark ignition event further includes executing a spark ignition event during the expansion stroke of the cylinder of the engine at approximately 30° after top-dead-center during the expansion stroke of the piston.

DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses.

Figure 1:
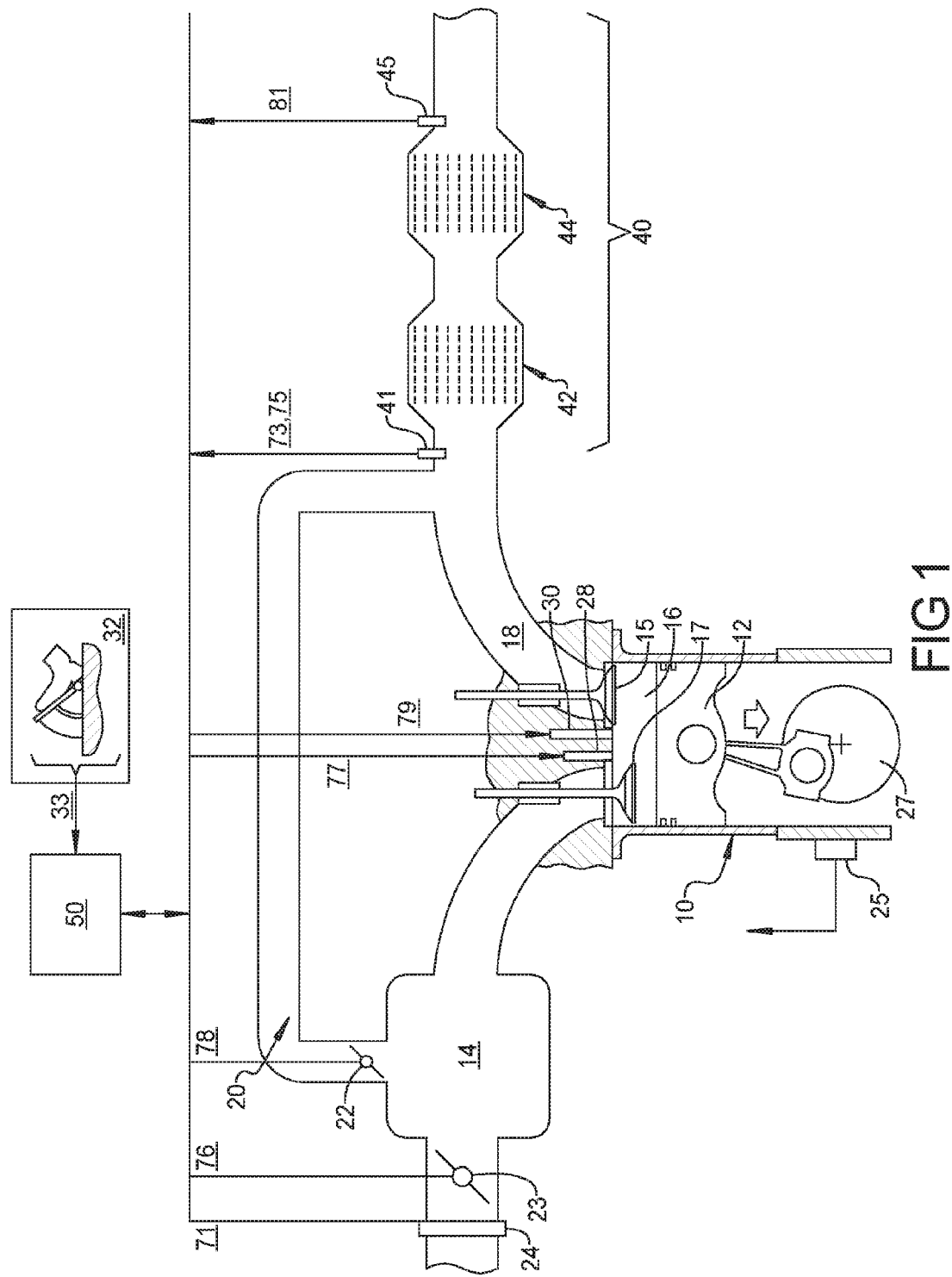
FIG. 1 is a schematic diagram of a spark-ignition direct injection (SIDI) internal combustion engine fluidly coupled to an exhaust aftertreatment system and signally and operatively connected to a control module in accordance with the disclosure.

Referring now to the drawings, wherein the showings are for the purpose of illustrating certain exemplary embodiments only and not for the purpose of limiting the same, FIG. 1 schematically shows a multi-cylinder spark-ignition direct-injection (SIDI) internal combustion engine 10 fluidly coupled to an exhaust aftertreatment system 40 and operatively connected to a control module 50. The SIDI engine 10 is configured to operate in a four-stroke combustion cycle including repetitively executed intake-compression-ignition-exhaust strokes, or any other combustion cycle. The exhaust aftertreatment system 40 is configured as a passive $NH_3$-SCR system that includes a three-way catalytic converter (TWC) 42 fluidly coupled to and upstream of an ammonia-selective catalytic reduction ($NH_3$-SCR) catalyst 44 in one embodiment.

A single piston 12 of the SIDI engine 10 is illustrated. The SIDI engine 10 preferably includes an intake manifold 14, combustion chamber 16, intake and exhaust valves 17 and 15, respectively, and an exhaust manifold 18. In one aspect, the SIDI engine 10 also includes an exhaust gas recirculation (EGR) system 20 including an EGR valve 22. The intake manifold 14 preferably includes a mass airflow sensing device 24 that generates a mass airflow signal 71 corresponding to a mass flowrate of engine intake air. The intake manifold 14 optionally includes a throttle device 23 in one embodiment. An air/fuel ratio sensing device 41 is configured to monitor an exhaust gas feedstream of the SIDI engine 10, and preferably generates signal outputs including an air/fuel ratio signal 75 and an exhaust gas feedstream temperature signal 73. A second sensor 45 is configured to monitor the exhaust gas feedstream downstream of the exhaust aftertreatment system 40, and generates an exhaust feedback signal 81 for control and diagnostics.

The SIDI engine 10 is configured to operate in a stratified-charge combustion mode at a lean air/fuel ratio. The SIDI engine 10 is further configured to operate in a homogeneous-charge combustion mode at a lean air/fuel ratio, at a stoichiometric air/fuel ratio, and at a rich air/fuel ratio. Operation of the SIDI engine 10 is in response to engine load, which includes an operator torque request, auxiliary engine loads e.g., hydraulic pumps and low-voltage electric generators, and non-engine loads, e.g., high-voltage electric motor/generators associated with hybrid powertrain systems.

The SIDI engine 10 includes a fuel injector 28 configured to directly inject a fuel pulse into the combustion chamber 16 in the vicinity of a spark plug 30 to generate a cylinder charge in response to a pulsewidth command 77. The spark plug 30 is configured to ignite the cylinder charge in the combustion chamber 16 in response to a spark signal 79. A rotational position sensor 25 is configured to monitor rotational position and speed of a crankshaft 27 of the SIDI engine 10. The description of the SIDI engine 10 is illustrative, and the concepts described herein are not limited thereto. The concepts described herein apply to other internal combustion engines configured to operate lean of stoichiometry fluidly coupled to the exhaust aftertreatment system 40 configured as a passive $NH_3$-SCR system.

The exhaust manifold 18 channels an exhaust gas feedstream to the exhaust aftertreatment system 40. The exhaust aftertreatment system 40 includes the TWC 42 fluidly coupled to and upstream of the $NH_3$-SCR catalyst 44 in one embodiment.

The TWC 42 includes one or more ceramic or metallic substrate elements having a multiplicity of flowthrough passageways that are coated with a washcoat including one or more catalytically active materials. In one embodiment the TWC 42 is coated with catalytically active materials for oxidizing HC and CO molecules and reducing $NO_x$ molecules in the exhaust gas feedstream in response to engine operating conditions including air/fuel ratio. In one embodiment the TWC 42 is configured in a close-coupled arrangement relative to the exhaust manifold 18 of the SIDI engine 10.

The $NH_3$-SCR catalyst 44 includes one or more substrate elements preferably fabricated from cordierite material and having a multiplicity of flowthrough passageways that are preferably coated with a zeolite washcoat and catalytic materials including, e.g., a catalytically active base metal.

The zeolite washcoat and catalytic materials store ammonia (NH$_3$) under specific operating conditions and release stored NH$_3$ for reacting with NO$_x$ molecules in the exhaust gas feedstream under other specific operating conditions. It is appreciated that the NH$_3$ storage capacity of the NH$_3$-SCR catalyst 44, i.e., the amount of NH$_3$ that may be stored on the NH$_3$-SCR catalyst 44 correlates to an inlet temperature of the NH$_3$-SCR catalyst 44. When the inlet temperature increases above a threshold temperature, the NH$_3$ storage capacity decreases.

NH$_3$ may be generated in the TWC 42 by periodically modulating operation of the SIDI engine 10 to generate an exhaust gas feedstream that includes nitrides of oxygen (NO$_x$), carbon monoxide (CO), and hydrogen (H2), to produce NH$_3$ in the TWC 42. Such engine modulation may include engine operating conditions that include a rich air/fuel ratio (AFR) excursion during which the TWC 42 converts rich exhaust gas constituents to CO, H$_2$O, and NH$_3$. In one embodiment, such engine operation may include executing rich fuel pulses to generate NH$_3$ in the TWC 42 that may be stored and used in the NH$_3$-SCR catalyst 44.

Stored NH$_3$ may be used in the NH$_3$-SCR catalyst 44 in accordance with the following chemical equations. In a rich air/fuel ratio environment, the governing chemical equation includes the following.

$$NO_x + H_2/CO \leftrightarrow NH_3 + CO_2 \qquad [1]$$

In a lean air/fuel ratio environment, the governing chemical equation includes using the stored NH$_3$ for lean NO$_x$ conversion as follows.

$$NO_x + NH_3 \leftrightarrow N_2 + H_2O \qquad [2]$$

The control module 50 in communication with an operator interface system 32, the mass airflow sensing device 24, the air/fuel ratio sensor 41, and the exhaust feedback sensor 45, from which it discerns corresponding signals including an operator torque request 33, mass airflow 71, air/fuel ratio 75, exhaust gas feedstream temperature 73, and exhaust feedback 81. The operator interface system 32 monitors operator inputs provided by an accelerator pedal and a brake pedal, and generates one or more signals indicating the operator torque request 33. The control module 50 operatively connects to the fuel injector 28, the spark plug 30, the throttle device 23, and the EGR valve 22. The control module 50 is configured to execute methods to control operation of the SIDI engine 10 to form the cylinder charge in response to the operator torque request 33.

The control module 50 operates in a first engine fueling mode to control operation of the fuel injector 28 by commanding pulsewidth 77 to deliver a fuel pulse to the combustion chamber 16 in response to the operator torque request 33. The pulsewidth 77 is a time period during which the fuel injector 28 is opened and delivering the fuel pulse. The delivered fuel pulse interacts with intake air and any internally retained and externally recirculated exhaust gases to form a cylinder charge in the combustion chamber 16 in response the operator torque request 33. It is appreciated that the control module 50 may command multiple fuel injection events using corresponding multiple pulsewidths 77 to cause the fuel injector 28 to deliver the fuel pulse to the combustion chamber 16 during each cylinder event.

In one aspect, the control module 50 operates the EGR valve 22 by commanding an EGR valve opening command 78 to cause the EGR valve 22 to operate at a preferred EGR flowrate to achieve a preferred EGR fraction in the cylinder charge. It is appreciated that age, calibration, contamination and other factors may affect operation of the EGR system 20, thus causing variations in in-cylinder air/fuel ratio of the cylinder charge. The control module 50 operates the throttle device 23 by commanding a throttle valve opening command 76 to command a preferred fresh air mass flowrate for the cylinder charge. In one embodiment, the control module 50 operates a turbocharger device (not shown) to command a preferred boost pressure associated with the cylinder charge.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event such as engine start-up, fuel cutoff (FCO) mode entry, hybrid powertrain operation events, protracted idle time durations and the like. Operation in the FCO mode preferably includes discontinuing fuel flow through all of the injectors to the combustion chambers, with the engine only pumping air during each engine rotation. FCO mode is initiated under certain SIDI operating conditions such as deceleration, some hybrid powertrain operating modes, and the like. The throttle device 23 may be opened to minimize pumping losses in FCO mode.

Figure 2:
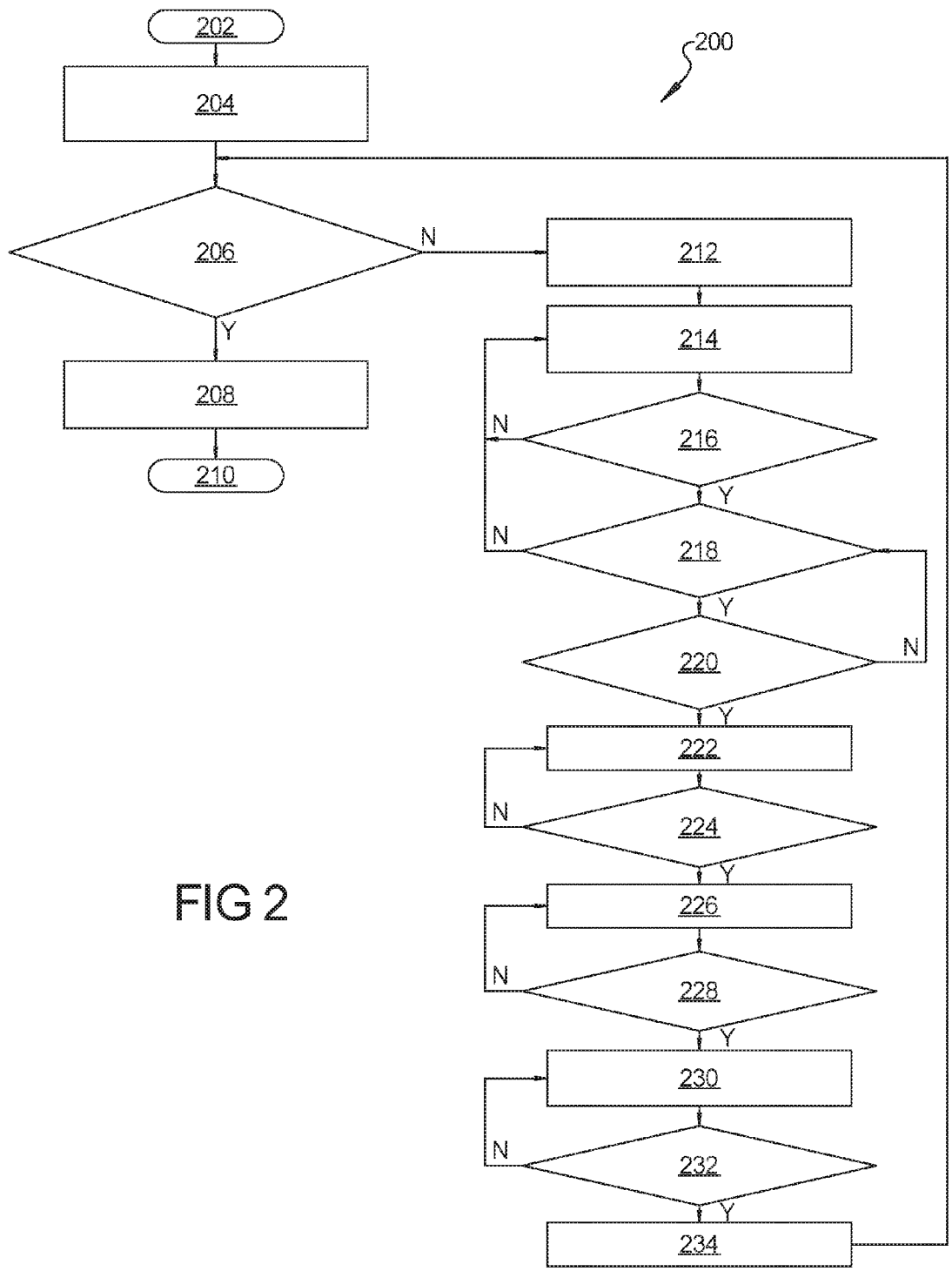
FIG. 2 is a flowchart depicting an embodiment of the method in accordance with principles of the present invention.

Referring now to FIG. 2, a flowchart illustrating a method 200 of a control routine according to an aspect of the present invention is executed on the SIDI engine 10 of FIG. 1 in accordance with an aspect of the present invention. The method 200 of FIG. 2 monitors and operates an embodiment of the SIDI engine 10 including the exhaust aftertreatment system 40 including the TWC 42 and the NH$_3$-SCR 44 described herein. It should be appreciated that the concepts described herein may be applied to other internal combustion engine systems that employ an embodiment of the TWC 42 and the NH$_3$-SCR 44 as part of an exhaust aftertreatment system for treating NO$_x$ emissions in an exhaust gas feedstream.

The method 200 is reduced to routines that are iteratively executed, including periodic execution during preset loop cycles, or executed on each cylinder event, or other execution cycle. Each of the method 200 iterations begins at block 202. At block 204 operations of the engine 10 and the exhaust aftertreatment system 40 are monitored to determine parameters associated with engine load, engine speed, NH$_3$ storage on the NH$_3$-SCR catalyst 44, and a bed temperature of the TWC 42. These parameters are determined using sensors, routines, calibrations, and parametric models that are known to a person having ordinary skill in the art and are not described in detail herein.

At block 206, the method determines whether the bed temperature of the TWC 42 is above a predetermined temperature threshold to achieve catalyst light-off (CLO). If the threshold CLO temperature has been achieved, the method proceeds to block 208 where the control module 50 commands the SIDI engine 10 to operate in a non-CLO mode. Subsequently, the method ends at block 210, and another iteration begins. However, if the CLO temperature threshold has not been met or exceeded, the method proceeds to block 212 where the control module 50 commands the SIDI engine 10 to operate in a second or CLO fueling mode. At block 212, in the CLO mode, the SIDI engine 10 operates to rapidly increase the bed temperature of the TWC 42.

Figure 3:
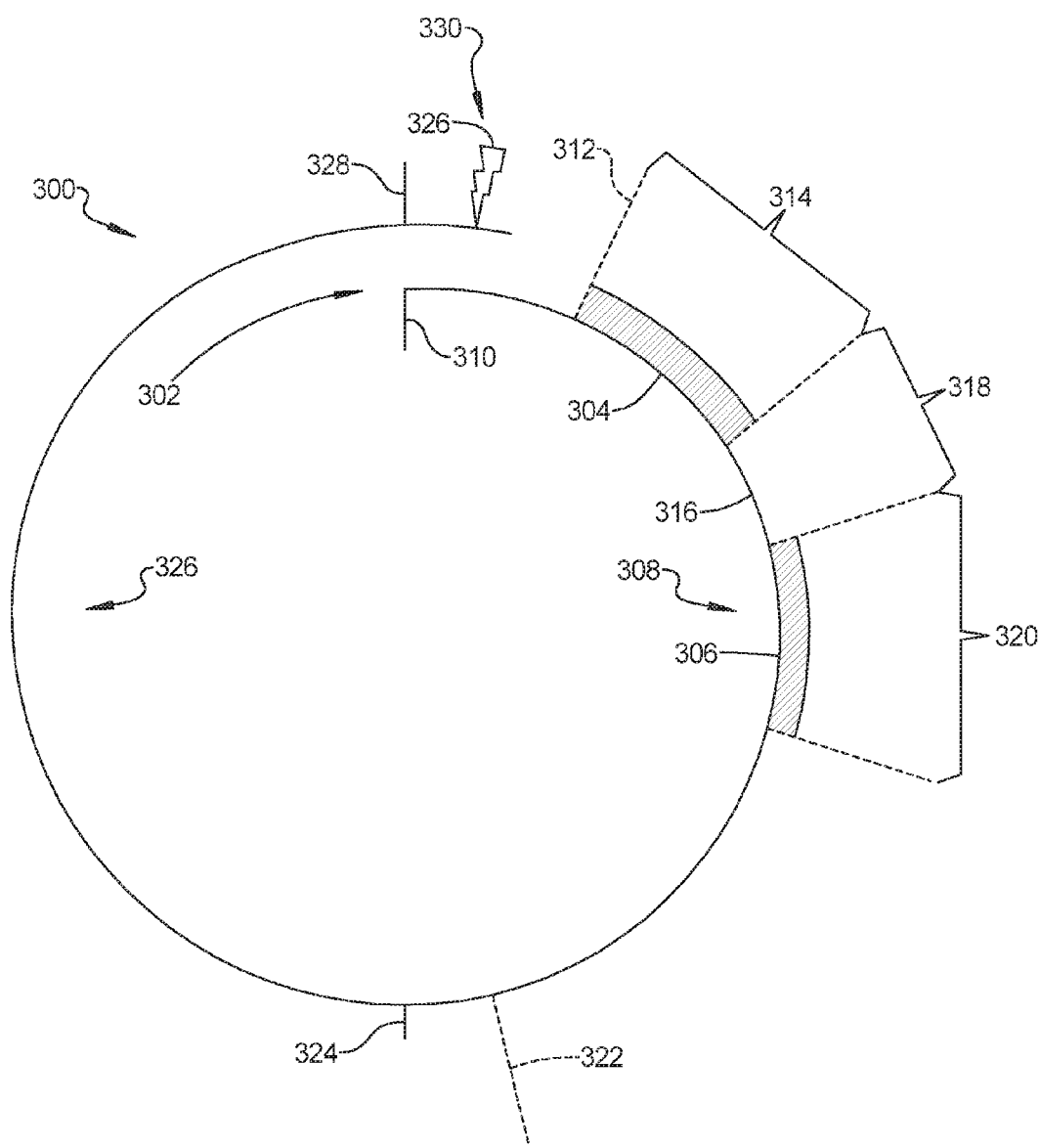
FIG. 3 is a crankshaft rotation diagram for a portion of the combustion cycle of the SIDI engine including several engine control events, according to the principles of the present invention.

With continuing reference to FIG. 2, and with additional reference to FIG. 3, the rotational position of the crankshaft 27 of the SIDI engine 10 is generally indicated by reference number 300. A direction of rotation of the crankshaft 27 is generally indicated by reference number 302. The SIDI engine 10 of FIG. 3 is depicted during CLO mode operation. In CLO mode, the control module 50 operates to rapidly increase the bed temperature of the TWC 42. To achieve the rapid increase in bed temperature of the TWC, the control module 50 sends pulsewidth commands 77 to the injector 28 as well as an ignition timing command 79 to the spark plug 30. The timing of the pulsewidth commands 77 is determined with reference to the rotational position of the crankshaft 27 as reported by the rotational position sensor 25. In the example of FIGS. 2 and 3, the control module 50 sends a first pulsewidth command 304 and a second pulsewidth command 306 to the injector 28.

At block 214, the control module 50 monitors the signal from the rotational position sensor 25 and relates the rotational position of the crankshaft 27 to the position of a piston 12 within the SIDI engine 10. It should be appreciated that while the method 200 is described as applying to a single piston 12 of an SIDI engine 10, the method applies iteratively to each of the cylinders 12 of an exemplary multi-cylinder SIDI engine 10 according the principles of the present invention.

At block 216, the control module 50 monitors fuel pressure and determines whether the fuel pressure is above a predetermined threshold pressure. In order to rapidly raise the bed temperature of the TWC, and thereby reduce gas and particulate emissions, fuel injected into the piston 12 must be properly atomized. For example, in order to achieve appropriate atomization of the fuel within the piston 12 of an SIDI engine 10, the fuel injector 28 must inject fuel at pressures above approximately 15 megapascals (MPa). It should be appreciated that while the threshold pressure is described as 15 MPa, that in practice, the threshold pressure may vary depending on the specifications of the SIDI engine 10 to which the present invention is applied. For instance, the threshold pressure is contemplated to be within a range of 15 MPa to 30 MPa. Additionally, achieving appropriate atomization of the fuel increases drivability and aids in maintaining predetermined acceptable threshold levels of noise, vibration, and harshness (NVH). If the threshold pressure has not been met, the method returns to block 214 and the control module 50 continues to monitor the rotational position of the crankshaft 27. However, once the threshold fuel pressure has been achieved, the method proceeds to block 218 where the control module 50 determines whether the piston 12 is at the start of an intake stroke 308.

The start of the intake stroke 308 is generally indicated by reference number 310 in FIG. 3. In terms of rotational position, the start of the intake stroke 310 occurs at a crankshaft rotational position of 360°. If the control module 50 determines that the piston 12 is not entering an intake stroke 308, the method returns to block 214, and the control module 50 continues to monitor the rotational position of the crankshaft 27. However, if the piston 12 is entering an intake stroke 308, the method proceeds to block 220 where the control module 50 determines whether a first threshold rotational position 312 of the crankshaft 27 within the intake stroke 308 for the piston 12 has been achieved. If the first threshold position 312 has not been achieved, the method returns to block 218 and the control module 50 continues to monitor the rotational position of the crankshaft 27 within the intake stroke 308. In one aspect, the first threshold position 312 of the crankshaft 27 is approximately 300° before top-dead-center (BTDC) during the intake stroke 308. However, it should be appreciated that the first threshold position 312 of the crankshaft 27 may be any of a range of values between about 360° BTDC and 180° BTDC during the intake stroke 308 of the SIDI engine 10 of this disclosure. Once the first threshold position 312 has been achieved, the method 200 progresses to block 222 where the control module 50 initiates the first fuel injector pulsewidth command 304.

The first injector pulsewidth command 304 directs the injector 28 to open for a first predetermined duration of time 314, and thereby supply pressurized fuel to the piston 12 of the SIDI engine 10. In one aspect, the first predetermined time duration 314 is between 0.5 and 1.5 milliseconds. However, it should be appreciated that the first predetermined time duration 314 will vary, and may depart from the 0.5-1.5 ms range depending on a number of factors including engine rotational speed, fuel pressure, engine load, TWC bed temperature, and the like. Once the first injector pulsewidth command 304 has been initiated, the control module 50 determines whether the first predetermined time duration 314 has elapsed at block 224. If the first predetermined time duration 314 has not elapsed, the method returns to block 222.

Once the first predetermined time duration 314 has elapsed, the method proceeds to block 226, where the control module 50 initiates a waiting period 316 with a second predetermined time duration 318 between the first and second injector pulsewidth commands 304, 306. In one aspect, the second predetermined time duration 318 is approximately 0.25 to 1.5 milliseconds. However, it should be appreciated that the second predetermined time duration 318 will vary, and may depart from the 0.25-1.5 ms range depending on a number of factors including engine rotational speed, engine load, TWC bed temperature, and the like. In one aspect, the second predetermined time duration 318 is shorter than or equal to the first predetermined time duration 314. At block 228, the control module 50 determines whether the second predetermined time duration 318 has elapsed. If the second predetermined time duration 318 has not elapsed, the method returns to block 226, and the control module 50 continues to wait. Once the second predetermined time duration 318 has been met, the method proceeds to block 230 where the control module 50 initiates the second injector pulsewidth command 306.

The second injector pulsewidth command 306 directs the injector 28 to open for a third predetermined time duration 320. The third predetermined time duration 320 completes before a second threshold rotational position 322. The second injector pulsewidth command 306 supplies pressurized fuel to the piston 12 of the SIDI engine 10. In one aspect, the third predetermined time duration 320 is between 0.5 and 1.5 milliseconds. Additionally, the second threshold rotational position 322 is about 200° BTDC. However, it should be appreciated that the third predetermined time duration 320 will vary, and may depart from the 0.5-1.5 ms range depending on a number of factors including engine rotational speed, fuel pressure, engine load, TWC bed temperature, and the like. The third predetermined time duration 320 may also depart from the 200° BTDC threshold limitation, so long as the third predetermined time duration ends before bottom-dead-center (BDC) 324 wherein the compression stroke 326 begins. Additionally, in the SIDI engine 10 of this disclosure, the first and second injector pulsewidth commands 304, 306 are contemplated to produce first and third predetermined time durations 314, 320 that are substantially equivalent to one another. In one aspect, when the first and third predetermined time durations 314, 320 are substantially equivalent, a first fuel quantity supplied to the piston 12 during the first predetermined time duration 314 is substantially equal to a second fuel quantity supplied to the piston 12 during the third predetermined time duration 320. Additionally, first and second quantities of fuel supplied to the piston 12 are determined in relation to generating a preferred amount of NH$_3$ and/or particulate matter in the TWC 42 for a particular embodiment of the system and the temperature of the TWC.

At block 232 the control module 50 determines whether the third predetermined time duration 320 has elapsed. If the third predetermined time duration 320 has not elapsed, the method returns to block 230 and the control module 50 continues to monitor the third predetermined time duration 320. Once the third predetermined duration 320 has elapsed, the method proceeds to block 234.

At block 234, the control module 50 sends an ignition timing command 79 to the spark plug 30. While operating in CLO mode, a spark ignition event 326 is executed at about 30° after TDC (aTDC) 328 during an expansion stroke 330. The fuel injected during the first and second injector pulsewidth commands 304, 306 in CLO mode passes through each combustion chamber 16 substantially uncombusted. In one example, the cylinder charge has a rich air/fuel ratio. A portion of the injected fuel may burn in the combustion chamber 16. A remaining portion of the injected fuel oxidizes in the TWC 42 to generate heat, which increases the TWC's 42 operating temperature. The exhaust gas constituents generated by oxidizing the injected fuel on the TWC 42 include CO, H$_2$O, and NH$_3$. Once the spark plug 30 has initiated the spark ignition event 326, the method returns to block 206 where the TWC 42 bed temperature is monitored once more.

In a further example, the method 200 of FIG. 2 is applied to an SIDI engine 10 under circumstances in which the TWC 42 bed temperature has fallen below the threshold CLO temperature. For example, the method 200 may be executed in response to occurrence of an event such as engine start-up, fuel cutoff (FCO) mode entry, protracted idle time durations and the like. Each of the engine start-up, FCO mode, hybrid powertrain operation modes, and protracted idle times produce quantities of exhaust gas thermal energy that are insufficient to maintain the threshold CLO temperature within the TWC 42. Therefore, once the TWC 42 bed temperature falls below the threshold CLO temperature during any of the modes or events described above, the method 200 is applied.

Moreover, if any one of the engine speed, the NH$_3$ storage on the NH$_3$-SCR catalyst 44, and the bed temperature of the TWC 42 is less than the corresponding minimum threshold, operation in the FCO mode is commanded in conjunction with executing the CLO mode via the method 200 of FIG. 2.

Additionally, the magnitude of NH$_3$ generated during execution of the method 200 may not be sufficient to meet needs for NH$_3$ during ongoing operation, and thus the method 200 may be used in conjunction with other NH$_3$-generating methods.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for operating a spark-ignition direct-injection internal combustion engine coupled to an exhaust aftertreatment system including a catalytic converter, the method comprising:
   monitoring an operating state of the catalytic converter;
   determining the temperature of the catalytic converter;
   determining if a piston of the engine is entering an intake stroke;
   injecting a first quantity of fuel into a cylinder in which the piston of the engine is entering the intake stroke; and
   injecting a second quantity of fuel into the cylinder in which the piston of the engine is entering the intake stroke.

2. The method of claim 1, wherein monitoring an operating state of the catalytic converter further comprises predicting the temperature of the catalytic converter.

3. The method of claim 1, wherein determining if a piston of the engine is entering an intake stroke further comprises monitoring a crank shaft position of the engine.

4. The method of claim 3, wherein injecting a first quantity of fuel into a cylinder further comprises injecting the first quantity of fuel into the cylinder when a first threshold crank position has been reached.

5. The method of claim 4, further comprising waiting a predetermined interval of time after injecting the first quantity of fuel into the cylinder.

6. The method of claim 5, wherein injecting a second quantity of fuel into a cylinder further comprises injecting the second quantity of fuel into the cylinder when the predetermined interval of time has lapsed.

7. The method of claim 6, wherein injecting a first quantity of fuel into a cylinder further comprises injecting the first quantity of fuel into the cylinder when a first threshold crank position of 300 degrees of crank shaft rotation has been reached.

8. The method of claim 7, wherein injecting a second quantity of fuel into a cylinder further comprises injecting the second quantity of fuel into the cylinder before a crank position of 200 degrees of crank shaft rotation has been reached.

9. The method of claim 1, further comprises retarding an initiation of a spark in the cylinder.

10. A method for operating a spark-ignition direct-injection internal combustion engine coupled to an exhaust aftertreatment system including a catalytic converter, the method comprising:
    determining an operating temperature of the catalytic converter;
    monitoring a crank shaft position of the engine;
    determining if a piston within a cylinder of the engine is entering an intake stroke from the crank shaft position;

selectively injecting a volume of fuel into the cylinder in which the piston of the engine is entering the intake stroke; and igniting the volume of fuel.

11. The method of claim 10, wherein determining an operating temperature of the catalytic converter further comprises predicting the temperature of the catalytic converter.

12. The method of claim 11, wherein selectively injecting a volume of fuel further comprises injecting a first quantity of fuel during the intake stroke, and injecting a second quantity of fuel during the intake stroke.

13. The method of claim 12, wherein the first quantity of fuel is substantially equal to the second quantity of fuel.

14. The method of claim 13, further comprising waiting a predetermined interval of time after injecting the first quantity of fuel before injecting the second quantity of fuel.

15. The method of claim 14, wherein the injecting a first quantity of fuel during the intake stroke, and injecting a second quantity of fuel during the intake stroke further comprises:

injecting the first quantity of fuel starting at approximately 300° before top-dead center during the intake stroke; and injecting the second quantity of fuel before approximately 200° before top-dead center during the intake stroke.

16. The method of claim 15, wherein the igniting the volume of fuel further includes retarding an initiation of a spark within the cylinder to approximately 30° after top-dead-center of an expansion stroke subsequent to the intake stroke.

17. A method for operating a spark-ignition direct-injection internal combustion engine coupled to an exhaust aftertreatment system including a three-way catalytic converter upstream of an NH3-SCR catalyst, comprising:

upon detecting a temperature of a three-way catalytic converter that is below a predetermined threshold temperature, operating the engine in a catalyst light-off mode;

executing a split pulse fuel injection in the intake stroke; and retarding a spark ignition event.

18. The method of claim 17, wherein executing the split pulse fuel injection further comprises:

executing a first fuel pulse having a first volume and a first time duration early in an intake stroke of a cylinder of the engine;

waiting a predetermined time period during the intake stroke; and executing a second fuel pulse late in the intake stroke and after the predetermined time period has elapsed; and wherein the second fuel pulse has a second volume and a second time duration substantially equal to the first volume and the first time duration late in the intake stroke and after the predetermined time period has elapsed.

19. The method of claim 18 wherein the retarding a spark ignition event further comprises executing a spark ignition event during the expansion stroke of the cylinder of the engine at approximately 30° after top-dead-center during the expansion stroke of the piston.

* * * * *